UNITED STATES PATENT OFFICE.

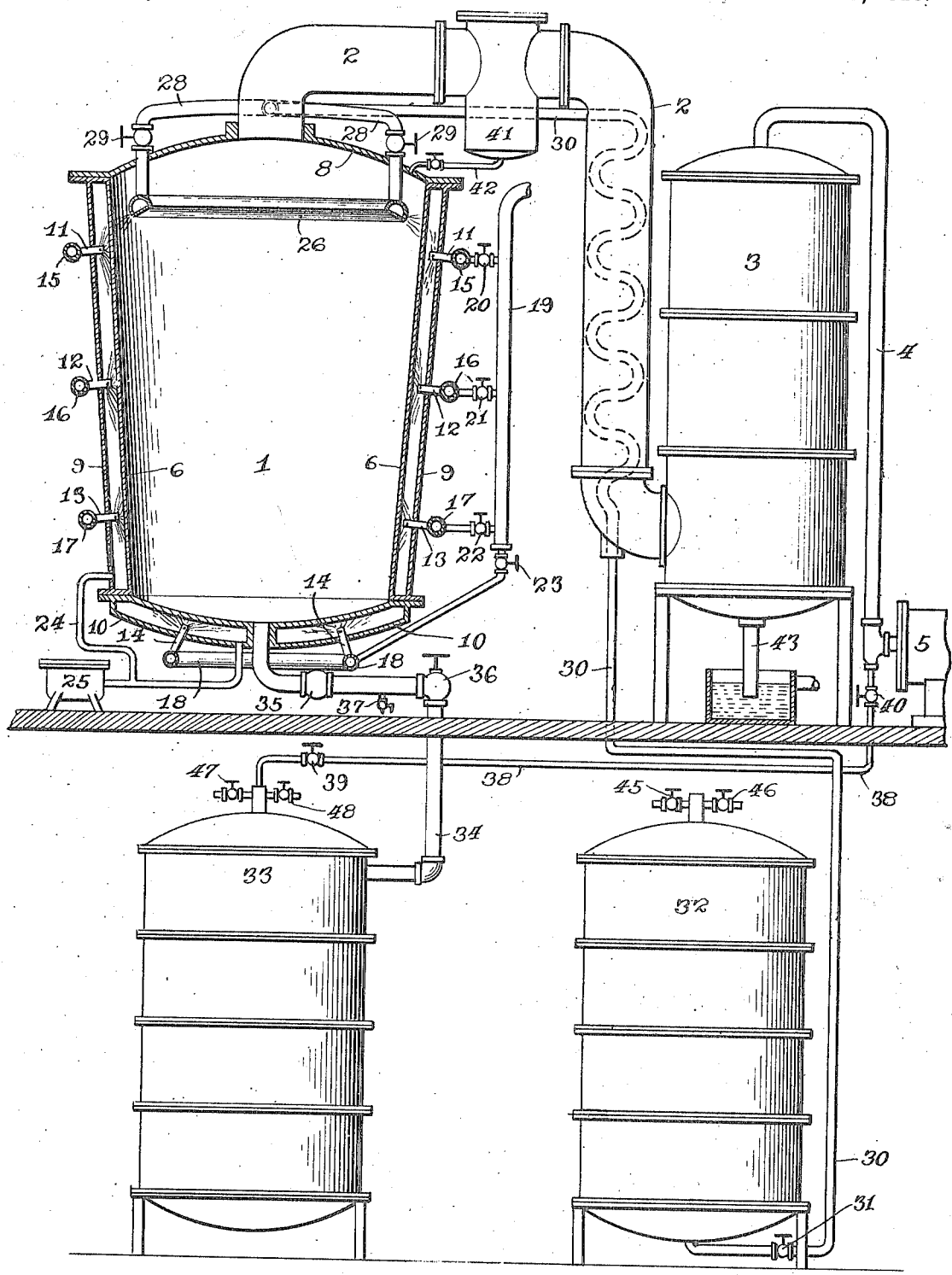

HERMAN HEUSER, OF CHICAGO, ILLINOIS.

PROCESS OF MAKING ALCOHOL-REDUCED BEVERAGES.

1,286,315.     Specification of Letters Patent.     Patented Dec. 3, 1918.

Original application filed November 25, 1916, Serial No. 133,506. Divided and this application filed February 24, 1917. Serial No. 150,641.

*To all whom it may concern:*

Be it known that I, HERMAN HEUSER, a citizen of the United States, residing at Chicago, in the county of Cook and State of Illinois, have invented certain new and useful Improvements in Processes of Making Alcohol-Reduced Beverages, of which the following is a specification, reference being had therein to the accompanying drawing.

My invention relates to the manufacture of alcohol-reduced beverages, and in particular to a new and improved process for the removal or reduction of the alcohol in any kind of alcoholic beverages. This process consists broadly speaking in spreading a charge of the alcoholic beverage in a flowing film or sheet on a vertical or inclined boiling zone of an evaporator, preferably a vacuum pan, continuously flowing the beverage in a sheet or film over the boiling zone and transmitting to each successive portion of the beverage in the film flowing in said zone the large volume of heat contained in steam in the form of latent heat to momentarily boil the beverage in said zone and instantaneously reduce its alcoholic content.

In the ordinary practices the dealcoholization of beverages proceeds at a very slow rate and the beverage is exposed to the heating medium for a long time, varying from several minutes to many hours; this is objectionable and disadvantageous because in dealcoholizing beer (for example) its quality as a beverage decreases in accurate proportion to the increase in time used for the evaporation of the alcohol, and the decrease in quality increases with the increase in time more rapidly at higher temperatures in the beverage than at lower temperatures. In the case of beer prolonged boiling, and particularly at high temperatures, imparts to the dealcoholized beer a well-known disagreeable taste and odor, and large quantities of its albuminoids are precipitated whereby the full-bodiness of the beer and its ability to make foam are impaired. By my invention the beverage while it is flowing in a thin film or sheet is exposed to the quick boiling action of the large quantity or volume of heat contained in steam in the form of latent heat which is instantaneously and continuously transmitted to the successive portions of the beverage in the flowing film, and hence the alcohol in the film in the boiling zone is instantaneously removed and the exposure of the beverage to the boiling action is so momentary or restricted in time that the characteristics or quality of the beverage is not affected no matter how high the boiling temperature in the flowing film may be, and then the alcohol-reduced beverage flows at once out of the boiling zone and away from any detrimental temperature that may be present therein. The deleterious effects from prolonged boiling in prior processes are thus eliminated by my invention which preserves in the dealcoholized liquid the original characteristics or qualities present before the alcohol content is reduced as to taste, odor, full-bodiness and ability to make foam. Also my invention practically eliminates the formation of foam or froth in the alcohol-reducing process, which has long been a difficult problem to solve as it seriously and obstinately interferes with the customary boiling heretofore employed in the distillation of alcohol for the manufacture of alcohol-reduced beer, because in boiling foam-producing beverages the formation of foam increases with reductions in the boiling temperature or increases in vacuum, but as my invention makes possible the use of high temperatures without injury to the beverage it diminishes the foam to a negligible quantity that does not interfere with the carrying out of the process. While the beer foams slightly at the discharge on the heating surface from the disengagement of $CO_2$, the foam subsides during its passage through the boiling zone, and so is entirely dealcoholized like the rest of the beverage. Similarly, the volume of vapor arising from boiling beverages, such as beer, increases with reductions in the boiling temperature or increases in vacuum, excessively large volumes of rarefied vapor being thus produced at low temperatures, for instance at beer-preserving temperatures, but as my invention enables the dealcoholization to take place at high temperatures without injury to the beverage it increases the density of the vapor and so greatly reduces its volume, and thereby makes it possible to use apparatus of smaller size to reduce the expense of its construction, installation and operation.

In the accompanying drawings the figure represents an apparatus suitable to carry out my process, the view being partly in section and partly in elevation.

In the drawing the reference numeral 1 indicates the evaporating chamber of a vacuum pan which is connected by its vapor tube 2 to a condenser 3 which is of the barometric, injection type and is connected by pipe 4 to a dry-vacuum pump 5.

The chamber 1 consists of a vertical cylindrical shell 6, which preferably is slightly greater in diameter at its top so that its walls are inclined, a dished bottom 7 and a dished top 8. The shell is provided with a steam jacket 9, and the bottom with a separate steam jacket 10; the jackets do not communicate with each other, and each is provided with a number of steam inlets. The steam inlets are arranged in banks or units, the banks for the shell jacket being at different levels and numbered respectively 11, 12 and 13, and the bank for the bottom jacket being numbered 14. The steam-inlets of each bank are connected to the same ring-shaped header, the inlets 11 to header 15, inlets 12 to a header 16, inlets 13 to a header 17, and inlets 14 to a header 18, and each of the units can be independently operated as its supply pipe leading from the source of steam supply 19 has a control-valve, these valves being numbered 20, 21, 22 and 23, respectively. This unit arrangement of steam inlets effects a uniform distribution of the steam, and the spaced arrangement of the units along the length of the chamber enables me to use them separately or in series as desired to increase or decrease the zone of evaporation. To increase the uniformity of the steam diffusion or distribution the various inlets are laterally perforated at their terminals in the jackets in such a way that the steam does not flow directly against the inner wall, but is discharged parallel to the wall and diffuses and spreads out between the walls. The steam jackets are provided with condensed-steam pipes 24 to carry the condensation to trap 25.

In the upper portion of the chamber, preferably on the level with the rim of its shell and close to the shell, an annular spray pipe 26 is placed parallel to the rim, and is provided with numerous small lateral perforations 27 on its outer periphery pointing to the shell. The pipe 26 is connected by branch feed pipes 28 having valves 29 and leading to the supply pipe 30, which is equipped with a valve 31 and leads to the storage tank 32 of the fermented beverage to be treated.

The central lower portion of the bottom of the chamber communicates with the receiver 33 for the alcohol-reduced beverage by means of discharge pipe 34 equipped with valves 35 and 36. The pipe section between the valves 35 and 36 is provided with a spigot 37 for taking samples during the process, after the two valves have been shut during the time the sample is being taken. The receiver 33 communicates with the vacuum pump 5 by a pipe 38 equipped with valves 39 and 40. The top of the pan is provided with the usual bull's eyes for the insertion of the electric lights, and with the observation glasses and the manhole door, which are not shown in the drawing. If desired the vapor pipe 2 may be provided with a separator 41 for particles of beverage carried out by the vapor, which is provided with a valved return pipe 42 leading back to the chamber. The condenser may have the usual barometrical discharge tube 43.

If desired the storage tank 32 may be provided with air valves 45 and 46, and the receiver 33 with air valves 47 and 48, for admitting or venting air.

The process is carried out as follows in the illustrated device:—

Valves 39 and 40 of pipe 38 and valves 35 and 36 of pipe 34 are opened, and the vacuum pump and condenser are put in operation, and when the desired vacuum has been obtained in the system some or all of the steam-valves 20, 21, 22, and 23 are opened together with valve 31 in the beverage-supply line. Thus simultaneously with the entrance of the live steam into the jackets 9 and 10, beer (for example) from the storage tank 32 enters through the supply pipes into the annular distributing pipe 26, being drawn into the latter by suction as the vacuum in the pan is large enough to lift the beer sufficiently for this purpose. The distributing pipe 26 emits or discharges the beer in the direction of the arrows and distributes it uniformly in a flowing film or sheet over the interior surface of the chamber. During the flow of the beer along the shell and dished bottom the steam is diffused or distributed in the steam jackets and uniformly and instantaneously gives off its latent heat to the beer which is thus kept in a state of boiling, changing the beer into vapors in proportion as the steam condenses. The pressure steam, whether live or exhaust, is of course of higher temperature than the beverage to be boiled, and is kept in a state of instantaneous and continuous condensation by the condensing surface afforded by the wall of the evaporator, whereby the large volume of heat contained in it as latent heat is instantaneously and continuously liberated and transmitted to the successive portions of the flowing beer. The amount of heat per pound is many times larger in steam than in any heated oil or water bath, on account of its latent heat which is never present in these others however hot, and by transmitting the large volume of heat contained in steam in the form of latent heat into a flowing film of beverage I am able to instantaneously dealcoholize the beverage in the flowing film so that exposure of each successive portion of the beverage to the boiling action is so momentary or reduced in time that its quality is not affected no matter how high the boiling temperature in the flowing film may be. The steam strikes the surface of the boiling zone at very high speed, as steam discharged with a gage pressure of say 100 pounds shoots forth with a velocity of 902 feet per second at constant density and at 1466 feet per second when allowed to expand in the steam jacket of the present apparatus. As the vapors containing the alcohol arise, they are carried off through tube 2 and at their arrival in condenser 3 they are condensed and then discharged through any suitable barometrical tube attached to the bottom of the condenser. The dealcoholized beer at its arrival at the base of the bottom of the pan flows through pipe 34 into the receiver 33, where it is held under vacuum until the desired quantity of beer has been dealcoholized. The discharge or flow of the beer from the pan proceeds without interruption, even when it is so large that the pipe 34 is filled with beer, because the vacuum in the receiver 33 is kept up to the proper point through the pipe 38, and any difference in vacuum in the pan and receiver would be in favor of the vacuum in the receiver being slightly higher than the vacuum in the pan on account of the absence of evaporation in the receiver and its direct communication with the pump.

The extent to which the alcohol is evaporated from the beer is controlled by regulating the quantity of steam emitted into the jackets 9 and 10 by their steam supply units. If the alcohol reduction is to be carried on to the point where the beer contains a little less than one-half of one per cent. of alcohol by volume, the upper two steam units will usually deliver ample steam for evaporation, provided the beer does not flow too fast from the storage tank into the pan, and the lower two units may be closed during the process. But if the flow of beer to the pan is increased one or both of the other steam units may be used. When the beer is to be completely dealcoholized the third unit from header 17 is also used, and to insure that no trace of alcohol is left in the alcohol-reduced beer the bottom unit from header 18 is likewise put in operation. When only the steam units of the shell-jacket are used, the bottom of the pan is not in the evaporating zone.

The utilization of the vacuum in the pan for the purpose of furnishing the power for supplying the beverage to the pan is of advantage as the flow of beer into the pan stops the moment the vacuum in the pan is broken. There are many reasons why this latter may happen, and when it happens any further entrance of the beverage into the pan would be not only purposeless but also detrimental to the beverage, because it will not be dealcoholized and therefore will increase the alcohol content of the beverage in the receiver.

From time to time during the process a sample may be taken from spigot 37 and tested as to its reduction in alcohol, and as the taking of a sample from the section of the discharge pipe 34 between the valves 35 and 36 requires only a momentary closing of these valves it will not interfere with the substantial continuity of the process and may be done frequently without danger to the beverage.

While in ordinary practice the dealcoholization of beverages proceeds at a very slow rate, by the present invention it is very rapid, being in fact instantaneous in the beverage in the boiling zone, whether the beverage be wholly or only partly dealcoholized, as the heat is instantaneously and uniformly supplied to all portions of the active or used boiling-surface in the vacuum, and as each successive portion of the beverage is thus only momentarily exposed to the boiling action its quality and characteristics are not impaired or affected even when the temperature in the boiling zone is above those ordinarily detrimental to the beverage. For example, I have found in practising my invention that the beverage is not impaired when the temperature in the flowing film of beverage in the boiling zone is at 212° Fahrenheit. I prefer to carry out my process in a vacuum pan in order to recover the alcohol, but it may be successfully practised in an open pan or evaporator.

It is advantageous to utilize the latent heat in the vapor to initially raise the temperature of the inflowing beverage as it is supplied to the chamber, and for this purpose the beverage feed-pipe 30 passes into and along the vapor tube 2, being arranged in coils therein. The vapors precipitated on the feed-pipe in the vapor tube flow as water into the condenser to be discharged as water together with the other condensations. For example, the heating of the beverage on its way to the vacuum pan considerably decreases the amount of steam necessary for boiling it, and as this heating is done by vapors arising from the boiling beverage a considerable saving in fuel for the production of the steam and a considerable saving in water necessary for precipitating the vapors in the condenser take place.

This application is a division of my companion application filed November 25, 1916, bearing Serial Number 133,506 of the series of 1915.

I claim:—

1. The process of manufacturing alcohol-reduced beverages which consists in continuously flowing a charge of fermented beverage in a film through a boiling zone, and transmitting to the beverage in the flowing film in the zone the latent heat of steam to momentarily boil the beverage in said zone and instantaneously evaporate alcohol from it.

2. The process of manufacturing alcohol-reduced beverages, which consists in flowing a charge of fermented beverage in a continuous film through a boiling zone in a vacuum, and in transmitting the latent heat of steam to the beverage in the flowing film to boil the beverage and reduce its alcohol content during its passage through said zone.

3. The process of manufacturing alcohol-reduced beer, which consists in flowing a charge of beer in a continuous film over a boiling surface of a vacuum pan, and in diffusing pressure steam over the opposite surface of said pan to boil the beer in the flowing film to reduce its alcohol content.

4. The process of manufacturing alcohol-reduced beer, which consists in spreading a charge of beer on the upper end of the inner boiling surface of a vacuum pan, flowing the beer in a continuous film over the inner surface of said pan, and in condensing steam on the outer surface of said pan for boiling the beer in the flowing film to reduce its alcohol content.

5. The process of manufacturing alcohol-reduced beer, which consists in flowing a charge of beer in a continuous film on the inner surface of a vacuum pan, diffusing pressure steam on the opposite surface of the pan for boiling the beer in the flowing film to reduce its alcohol content, and varying the area of the boiling zone by regulating the area of application of the steam to the pan.

In testimony whereof I affix my signature in presence of two witnesses.

HERMAN HEUSER.

Witnesses:
J. McRoberts,
E. H. Wilcox.